(12) United States Patent  (10) Patent No.: US 8,517,647 B2
Hilvers  (45) Date of Patent: Aug. 27, 2013

(54) ADJUSTABLE SUPPORT BRACKET FOR A HEADER TRANSPORT WAGON

(75) Inventor: Michael J. Hilvers, Fort Jennings, OH (US)

(73) Assignee: Unverferth Manufacturing Company Inc., Kalida, OH (US)

( * ) Notice: Subject to any disclaimer, the term of this patent is extended or adjusted under 35 U.S.C. 154(b) by 143 days.

(21) Appl. No.: 13/036,215

(22) Filed: Feb. 28, 2011

(65) Prior Publication Data

US 2012/0217277 A1  Aug. 30, 2012

(51) Int. Cl.
  *A01B 73/00*  (2006.01)
(52) U.S. Cl.
  USPC .................................................... 410/77
(58) Field of Classification Search
  USPC .................... 410/2, 44, 77, 80, 156
  See application file for complete search history.

(56) References Cited

U.S. PATENT DOCUMENTS

| | | | |
|---|---|---|---|
| 5,040,825 A * | 8/1991 | Kuhns ............................ | 280/789 |
| 5,333,904 A * | 8/1994 | Kuhns ............................ | 280/789 |
| 5,529,447 A * | 6/1996 | Bruns et al. ..................... | 410/2 |
| 5,785,472 A * | 7/1998 | Smith et al. .................... | 410/77 |
| 6,047,989 A * | 4/2000 | Wood ............................. | 280/789 |
| 6,272,824 B1 * | 8/2001 | Smith et al. .................... | 56/228 |

* cited by examiner

*Primary Examiner* — H Gutman
(74) *Attorney, Agent, or Firm* — Rothwell, Figg, Ernst & Manbeck, P.C.

(57) ABSTRACT

An adjustable support bracket for a transport wagon used to hold and transport a large object. The transport wagon has a frame with a top surface, opposed side surfaces and a bottom surface. The adjustable support bracket has an angled adjustable seat for supporting a portion of a large object. The angled adjustable seat has a top surface and leg members. The top surface includes an inclined plate. The leg members include a rear plate and a front portion. The leg members are connected to a first plate. The angled adjustable seat has at least one side plate connected by a hinge mechanism to permit at least one side plate to be adjusted to a pocket position or a lower position. A means for removably coupling the adjustable support bracket with the frame of the transport wagon without tools is provided, such that the angled adjustable seat can be secured onto the top surface to the frame of the transport wagon and the rear plate and the front portion of the angled adjustable seat can be clamped to the side surfaces of the frame of the transport wagon.

14 Claims, 6 Drawing Sheets

ADJUSTABLE SUPPORT BRACKET FOR A HEADER TRANSPORT WAGON

BACKGROUND OF THE INVENTION

1. Field of the Invention

The present invention relates generally to a support bracket for a transport wagon used to transport large objects, such as combine headers and other farm equipment.

2. Description of the Related Art

Transport wagons for transporting large farm equipment, such as a cutting header (grain platform, draper, or corn platform) of a combine harvesting machine, are known. FIG. 1 illustrates a conventional transport wagon.

A cutting header is the front mechanism of a combine harvesting machine that cuts the crop and feeds it to the harvesting machine for threshing. The cutting header is wider than the body of the harvesting machine and thus, it is difficult and unsafe to transport the entire harvesting machine. Due to its large size, the cutting header is removed from the combine harvesting machine and transported sideways on a transport wagon for safe road travel.

Generally support brackets are mounted on the frame of the transport wagon as a the mating structure between the transport wagon and the header, and support a portion of one end of the header.

U.S. Pat. Nos. 5,333,904; 5,785,472; and 6,272,824 each disclose known support brackets for transport wagons, which are secured to the frame with a variation of a bolt. For instance, U.S. Pat. No. 5,333,904 discloses a clamp that includes a nut and bolt that pulls two plates, one on each side of the frame, together, thereby clamping the support bracket to the frame. U.S. Pat. Nos. 5,785,472 and 6,272,824 disclose a bolt and a cam handle to clamp the support bracket to the frame in a similar manner. However, these designs are disadvantageous because bolt threads can get damaged and separate tools are required to remove and replace the bolt in order to adjust the support bracket height or re-position it along the frame. Another disadvantage is that the process of removing a threaded member (e.g. a bolt) and components is slow and time-consuming.

Other support brackets utilize various configurations to support different types of headers, e.g., headers with lower edges having different geometric configurations, corn headers, or grain platforms. For instance, the bracket disclosed by U.S. Pat. Nos. 5,333,904 and 5,785,472 require additional support member(s), and the bracket of U.S. Pat. No. 6,272,824 requires additional rest pad(s). These designs are disadvantageous because these secondary structures add extra, burdensome weight to the support bracket, making adjustments along the frame more difficult. A further disadvantage is that the secondary structures must be separately stored when not in use and thus are easily lost or misplaced.

Thus, there is a need for new and improved support brackets that do not suffer from the limitations of the prior art.

SUMMARY OF THE INVENTION

According to the present invention, an adjustable support bracket is provided for a transport wagon, used to hold and transport a large object with improvements over the prior art.

The conventional transport wagon has a frame with a top surface, opposed side surfaces and a bottom surface. According to an embodiment of the present invention, an adjustable support bracket has an angled adjustable seat for supporting a portion of a large object. The angled adjustable seat has a top surface and leg members. The top surface includes an inclined plate. The leg members include a rear plate and a front portion. The leg members are connected to a first plate. The angled adjustable seat has at least one side plate connected by a hinge mechanism to permit at least one side plate to be adjusted to a pocket position or a lower position. Means for removably coupling the adjustable support bracket with the frame of the transport wagon without tools is provided, such that the angled adjustable seat can be secured onto the top surface to the frame of the transport wagon and the rear plate and the front portion of the angled adjustable seat can be clamped to the side surfaces of the frame of the transport wagon.

According to another embodiment of the present invention, the adjustable support bracket has an angled adjustable seat that has a pin to secure a side plate in a pocket position.

According to another embodiment of the present invention, the adjustable support bracket has an inclined plate adapted to receive a side plate.

According to another embodiment of the present invention, the adjustable support bracket has a side plate adapted to receive a pin that secures the side plate in a pocket position.

According to another embodiment of the present invention, the adjustable support bracket has a leg member with a panel and two side panels.

According to another embodiment of the present invention, the adjustable support bracket has a leg member with a panel and two side panels, and the side panels are adapted to receive a pin that secures the side plate in a pocket position.

According to another embodiment of the present invention, the adjustable support bracket has a winch, flexible member, and winch bar for removably coupling the adjustable support bracket with the frame of the transport wagon without separate tools.

According to another embodiment of the present invention, the adjustable support bracket has a winch, strap, and winch bar for removably coupling the adjustable support bracket with the frame of the transport wagon without separate tools.

According to another embodiment of the present invention, the adjustable support bracket has a winch, wire, and winch bar for removably coupling the adjustable support bracket with the frame of the transport wagon without separate tools.

According to another embodiment of the present invention, the adjustable support bracket has a winch, cable, and winch bar for removably coupling the adjustable support bracket with the frame of the transport wagon without separate tools.

According to another embodiment of the present invention, the adjustable support bracket has leg members adapted to receive the flexible member.

According to another embodiment of the present invention, the adjustable support bracket has a hinge mechanism comprised of a bar.

According to another embodiment of the present invention, the adjustable support bracket has a flexible member attached to a hook that can be engaged with the hinge mechanism.

According to another embodiment of the present invention, the adjustable support bracket has height-adjust pins.

According to another embodiment of the present invention, the adjustable support bracket has a rear plate and front panel adapated to receive the height-adjust pins.

According to another embodiment of the present invention, the adjustable support bracket has a side plate or side plates secured to the hinge mechanism by a fastener.

According to another embodiment of the present invention, the adjustable support bracket has a side plate or side plates secured to the hinge mechanism by a spring washer.

Further applications and advantages of various embodiments of the present invention are discussed below with reference to the drawing figures.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
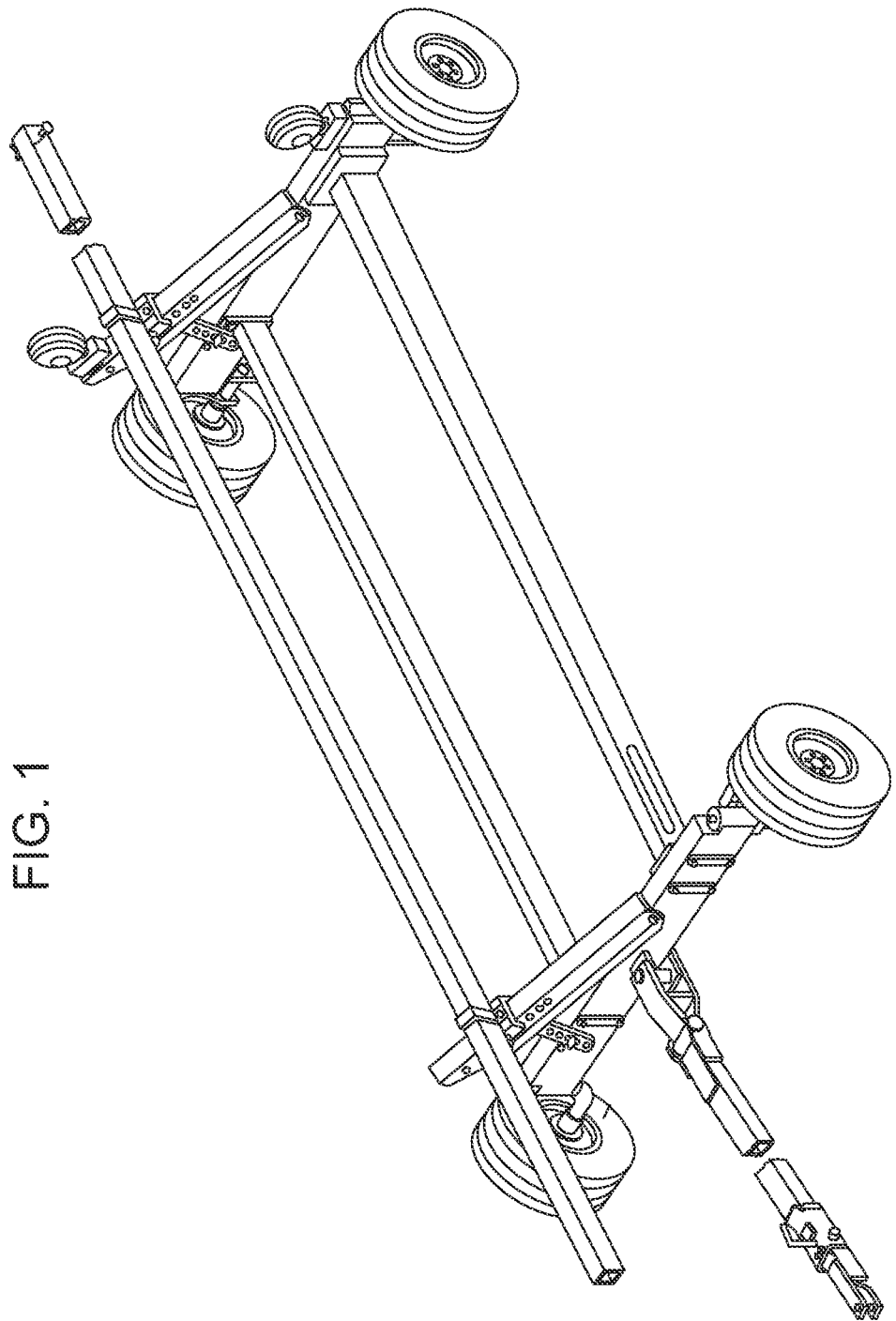
FIG. 1 is a perspective view of a conventional transport wagon.
Figure 2:
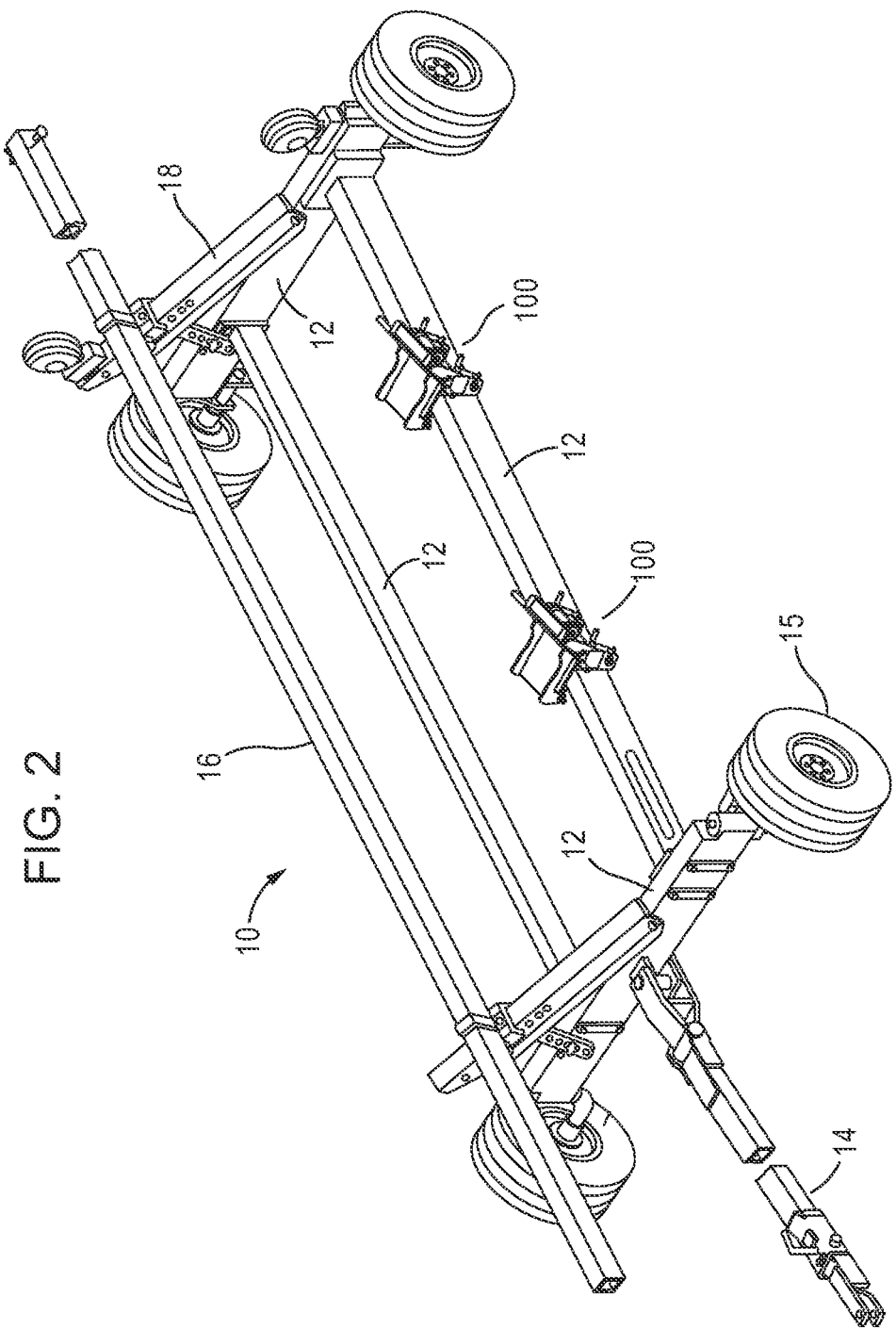
FIG. 2 is a perspective view of a transport wagon having two adjustable support brackets secured to the frame of the transport wagon according to an embodiment the present invention.

FIG. 2 depicts two adjustable support brackets (100), according to one embodiment, secured to one arm of the frame (12) of the transport wagon (10). The transport wagon (10) is typically used to transport different types of equipment (not shown) and can be towed by a motor vehicle (e.g., truck, tractor, etc.) with a tongue (14). As shown, the transport wagon (10) includes a main frame (12) coupled with caster wheels (15) and a rail (16) coupled with the frame (12) and supported by angled bars (18) that are adjustably connected to opposite sides of the frame (12). The rail can support a portion of the farm equipment and positions the farm equipment at an angle downwardly towards the adjustable support brackets (100). The adjustable support brackets (100) secured to the main frame (12) can receive and support a portion of the lower end of the farm equipment.

Figure 3:
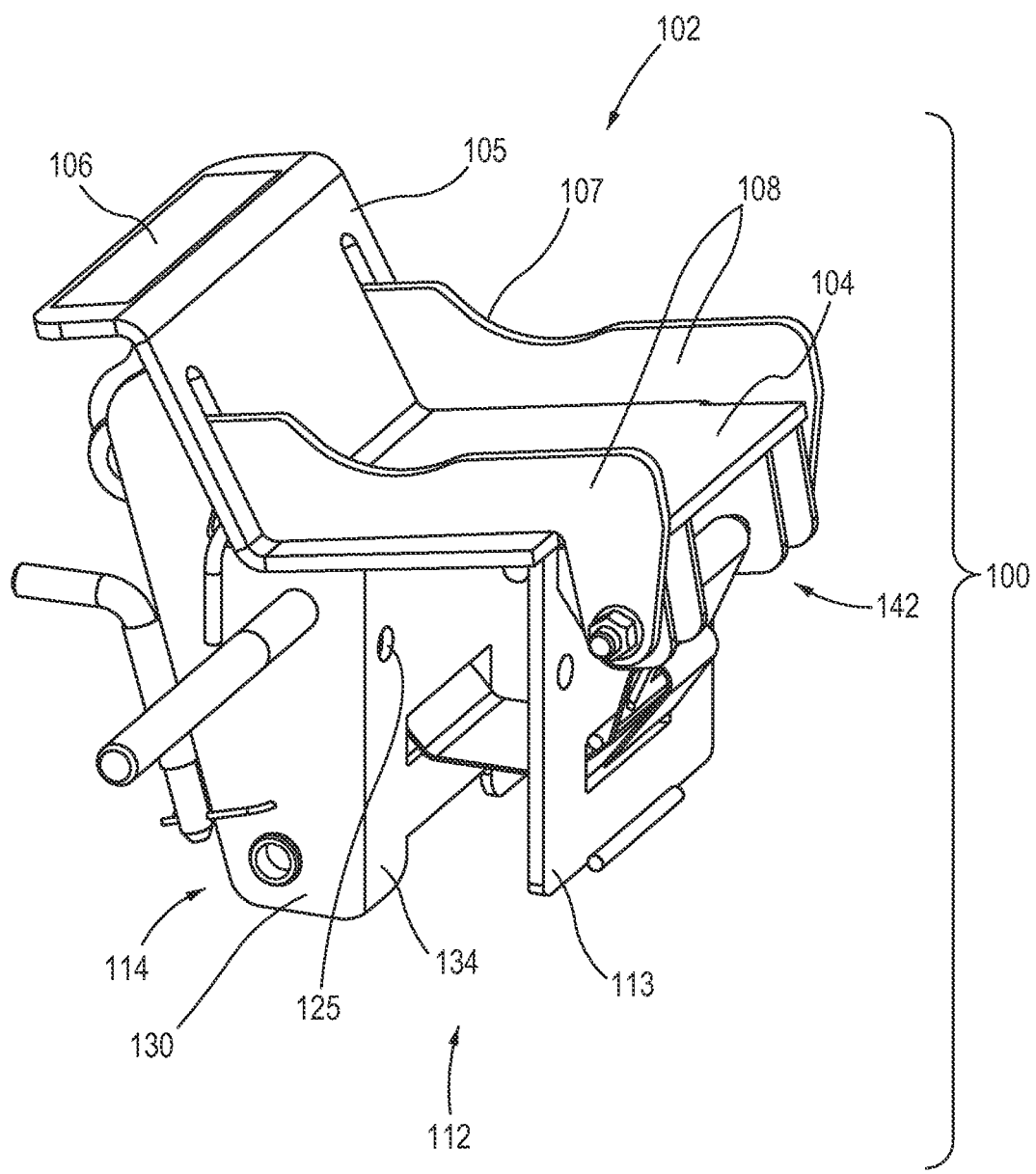
FIG. 3 is a perspective view, from the left and rear, of an adjustable support bracket according to an embodiment of the present invention.

FIG. 3 is an angled view, from the left and rear, of an adjustable support bracket (100) according to an embodiment of the present invention. As shown, the adjustable support bracket (100) may include an angled adjustable seat (102) for supporting a portion of a large object (not shown) to be secured thereto, and a mounting portion (112). The adjustable support bracket (100) can be removably coupled with the frame of the transport wagon without separate tools and adjustably positioned along the frame of the transport wagon. The angled adjustable seat (102) and the mounting portion (112) can be welded together to form a shape based on the frame of the transport wagon. The angled adjustable seat (102) may be one piece or comprised of a first plate (104), an inclined plate (105), and a third plate (106) welded together. The angled adjustable seat (102) includes one or more side plates (108), connected by a hinge mechanism (142). The side plates (108) can be formed of various shapes, e.g., a side plate can be curved to provide a specific contour (107) to better receive the object to be transported. The mounting portion (112) may include a number of plates. For example, the mounting portion may include two leg members (113, 114) welded to the angled adjustable seat (102), wherein one leg member is a rear plate (113) and a second leg member is a front portion (114) comprised of a front plate (134) and two side plates (130) welded to opposite ends of the front plate (134). The figures show two side plates (108), but the invention is intended to have one or more side plates.

Figure 4:
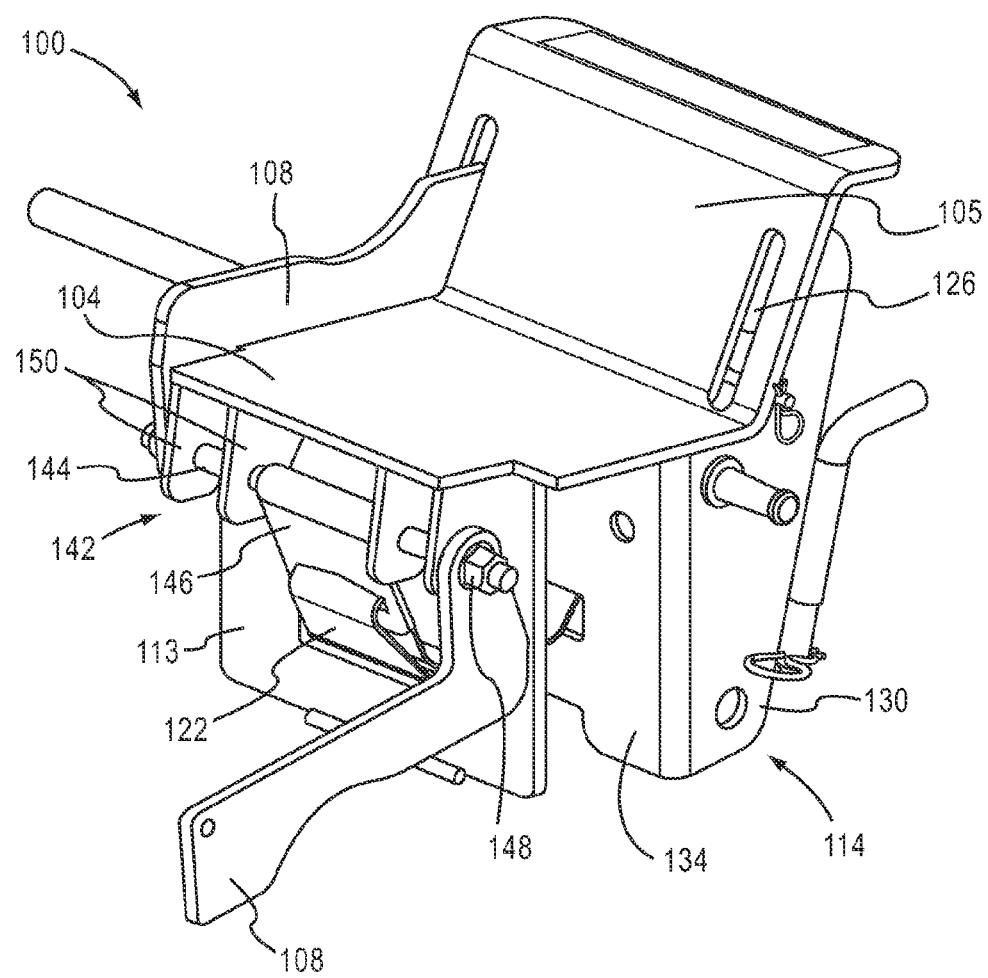
FIG. 4 is a perspective view, from the right and rear, of an adjustable support bracket according to an embodiment of the present invention.

FIG. 4 is an angled view, from the right and rear, of an adjustable support bracket (100) according to an embodiment of the present invention. The adjustable support bracket (100) may include a hinge mechanism (142) that can include small flanges (150) connected to the first plate (104) and the rear plate (113) of the angled adjustable seat. The hinge mechanism (142) can further include a shaft (144) that is engaged with the small flanges (150), e.g., a shaft (144) fitted through openings in the small flanges (150). The side plates (108) are engaged with the shaft (144), e.g., a shaft (144) fitted through openings in the side panels (108). A fastener (148) (e.g., nut and washer) can be provided to secure the side plate (108) to the shaft (144) and the outermost small flanges (150). Belleville spring washers (148) are preferred fasteners that eliminate rattling of the components during travel.

The side plate (108) can be rotated about the shaft (144) to an upper position (i.e. the left side plate (108) shown in FIG. 4) or a lower position (i.e. the right side plate (108) shown in FIG. 4). When one or more side plates (108) are in the upper position, the first plate (104) of the angled adjustable seat has a pocket configuration. The inclined plate (105) is adapted to receive a side plate (108) in the upper position. For instance, as shown in FIG. 4, the inclined plate (105) has corresponding slots (126) adapted to receive the side plates (108). When all side plates (108) are in the lower position, the first plate (104) of the angled adjustable seat has an L-shaped configuration. Accordingly, the first plate (104) of the angled adjustable seat can be set to various configurations simply by adjusting one or more side plates (108). There is no need for additional support members or rest pads for each desired configuration, although they are optional features to one skilled in the art. Compared to secondary support members or rest brackets, side plates cost less and reduce the manufacturing costs of the adjustable support bracket. The side plates can have universal or symmetrical designs. Moreover, side plates weigh less and improve the efficiency of the adjustable support bracket (100) by making it less burdensome to lift and move the angled adjustable seat.

Figure 5:
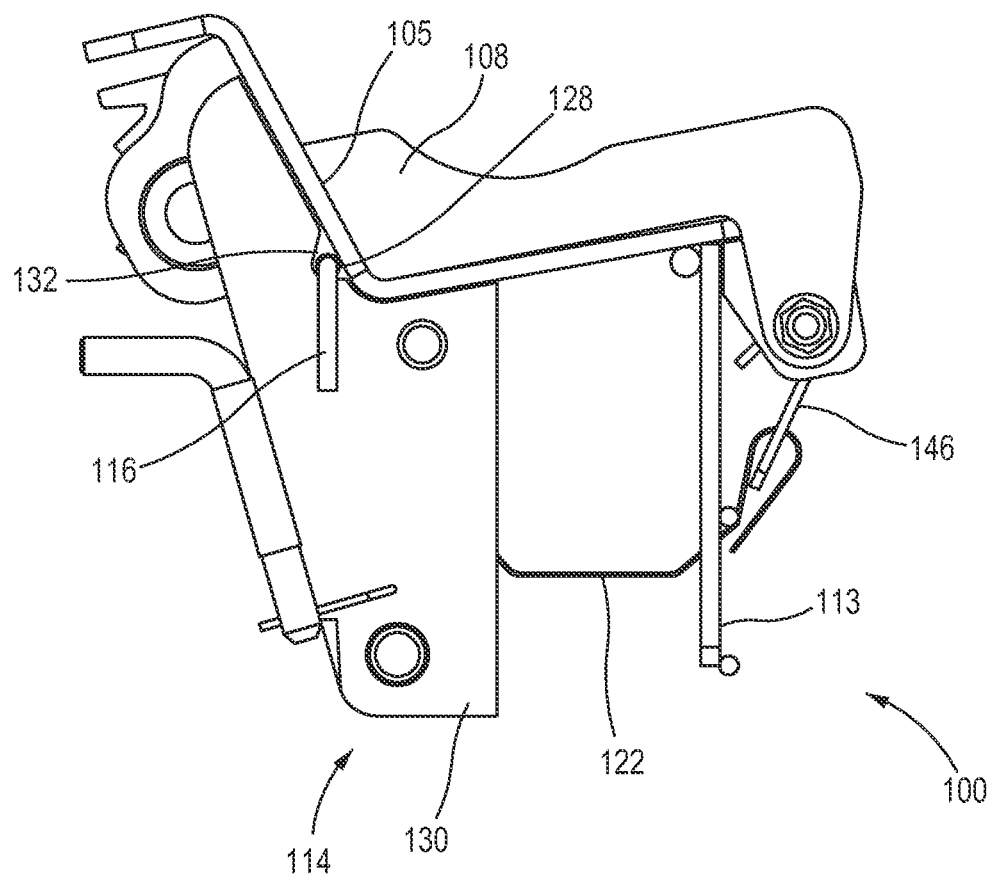
FIG. 5 is a side view of an adjustable support bracket according to an embodiment of the present invention.

FIG. 5 is a side view of an adjustable support bracket (100) according to an embodiment of the present invention. As shown, a pin (116) can be used as a securing means to secure a side plate (108) in the upper position. As shown, the side plates (130) of the front portion (114) of the angled adjustable seat can be adapted to receive the pin (116), e.g. with an opening (132) such that the pin runs behind the inclined plate (105). The side plate (108) can be provided with a hole (128) that can receive the pin (116) and which is aligned with the opening (132) in the side plates (130) when placed in the upper position.

Figure 6:
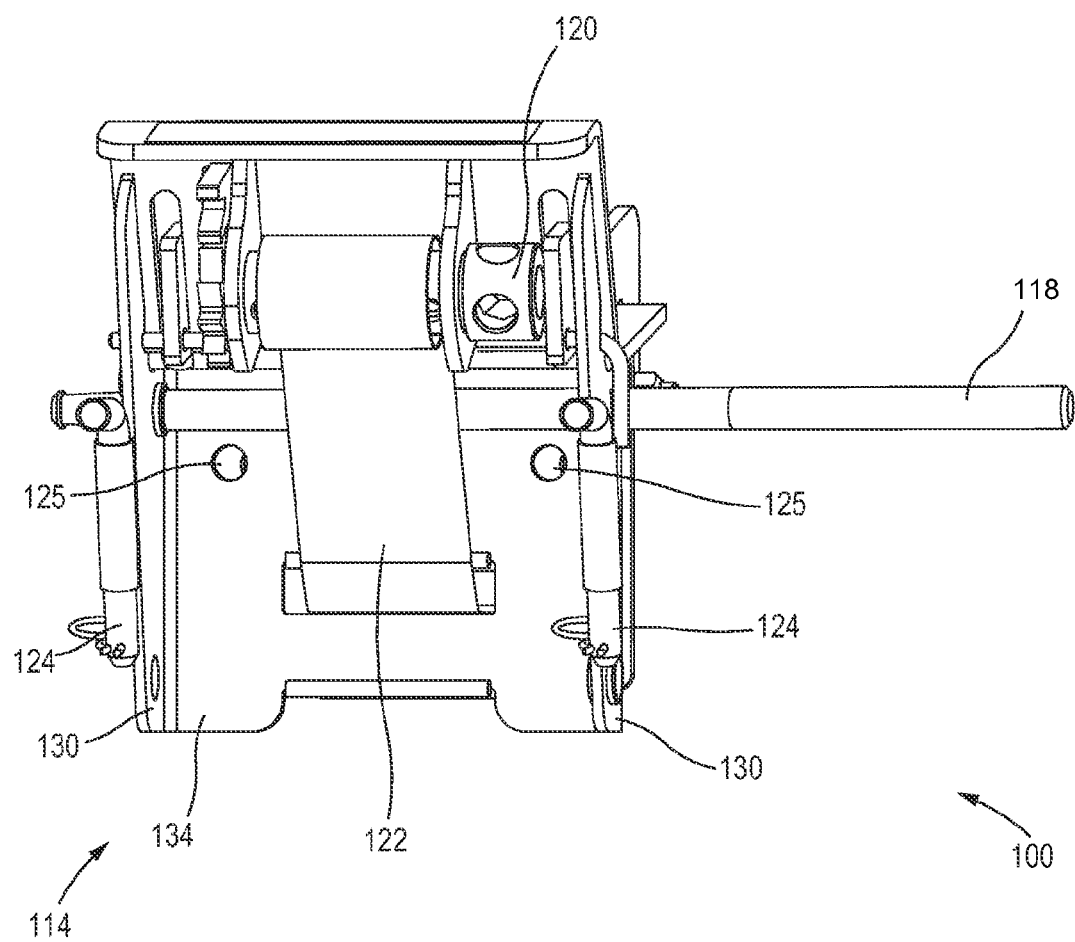
FIG. 6 is a front view of an adjustable support bracket according to an embodiment of the present invention.

FIG. 6 is a front view of an adjustable support bracket (100) according to an embodiment of the present invention. The adjustable support bracket (100) can include means for removably coupling, without tools, the adjustable support bracket (100) with the frame of the transport wagon.

For example, a winch (120) with a flexible strap (122) and winch bar (118) can be provided in one embodiment. The winch (120) is connected to the front plate (134) of the front portion (114) of the angled adjustable seat. As shown in FIGS. 4 and 5, one end of the flexible strap (122) can be attached to a fastener (e.g. a hook) (146) that can be secured to the shaft (144) of the hinge mechanism (142). When the angled adjustable seat is placed on the frame of the transport wagon, the free end of the flexible strap (122) can be extended through the rear plate (113) of the angled adjustable seat, under the wagon frame (not shown), through the front plate (134) of the front portion (114) of the angled adjustable seat (as shown in FIGS. 3-6) and fished through the spool of the winch (120) (as shown in FIG. 6). The winch bar (118) can be used to tighten the winch (120), thereby pulling down the angled adjustable seat onto the top surface of the frame and clamping the rear plate (113) and the front portion (114) of the angled adjustable seat to the side surfaces of the frame of the transport wagon.

The angled adjustable seat can be adjusted vertically on the frame or moved horizontally along the frame by releasing the winch (120), pulling the flexible strap (122) out of the spool of the winch (120) and making the desired adjustment. The angled adjustable seat can be adjusted vertically by lifting the angled adjustable seat and inserting the two height-adjust pins (124) through the corresponding holes (125) in the rear plate (113) and the front plate (134). (The holes (125) are shown in FIG. 3.) The angled adjustable seat can be adjusted horizontally along the frame by lifting the angled adjustable seat and moving it to the desired position along the frame. Once the desired adjustment has been made, the angled adjustable seat can be secured to the frame by fishing the flexible strap (122) through the spool of the winch (120) and tightening the winch (120).

The winch (120) shown in FIG. 5 is an example of means for removably coupling the adjustable support bracket (100) with the frame of the transport wagon without tools, but the invention is not intended to be limited to a winch. One key feature of the means for removably coupling the adjustable support bracket (100) with the frame of the transport wagon without tools is the flexible strap, which provides several advantages over the bolt variations disclosed in the prior art. Release and tightening of the strap around the frame is more time-efficient than aligning and securing bolts. A flexible strap also accommodates varying frame heights, whereas bolts require different sets of holes to match different frame heights. Moreover, a flexible strap better secures the angled adjustable seat to the frame, not only by clamping the rear plate (113) and the front portion (114) of the angled adjustable seat to the side surfaces of the frame of the transport wagon, but also by pulling down the angled adjustable seat onto the top surface of the frame. Furthermore, the flexible strap avoids problems associated with bolts, e.g. thread damage, cross thread, rust, or bind up. The flexible strap permits adjustment of the adjustable support bracket (100) in a timely manner.

Thus, a number of preferred embodiments have been fully described above with reference to the drawing figures. Other details of the embodiments of the invention should be readily apparent to one skilled in the art from the drawings. Although the invention has been described based upon these preferred embodiments, it would be apparent to those skilled in the art that certain modifications, variations, and alternative constructions would be apparent, while remaining within the spirit and scope of the invention.

I claim:

1. An adjustable support bracket for a transport wagon used to hold and transport a large object, said transport wagon having a frame with a top surface, opposed side surfaces and a bottom surface, said adjustable support bracket comprising:
    an angled adjustable seat for supporting a portion of a large object, said angled adjustable seat having a top surface comprising a inclined plate and leg members comprising a rear plate and a front portion, wherein, the leg members are connected to a first plate, wherein, the angled adjustable seat further comprises at least one side plate connected by a hinge mechanism to permit said at least one side plate to be adjusted to a pocket position or a lower position; and
    a tool-free coupling for removably coupling the adjustable support bracket with the frame of the transport wagon without tools, such that the angled adjustable seat is secured onto the top surface to the frame of the transport wagon and the rear plate and the front portion of the angled adjustable seat are clamped to the side surfaces of the frame of the transport wagon;
    wherein the angled adjustable seat further comprises a pin to secure said side plate or side plates in the pocket position.

2. The adjustable support bracket of claim 1, wherein the inclined plate is adapted to receive the side plate or side plates.

3. The adjustable support bracket of claim 2, wherein the side plate or side plates are adapted to receive the pin.

4. The adjustable support bracket of claim 3, wherein the front portion has a front panel and two side panels.

5. The adjustable support bracket of claim 4, wherein the side panels are adapted to receive the pin.

6. An adjustable support bracket for a transport wagon used to hold and transport a large object, said transport wagon having a frame with a top surface, opposed side surfaces and a bottom surface, said adjustable support bracket comprising:
    an angled adjustable seat for supporting a portion of a large object, said angled adjustable seat having a top surface comprising a inclined plate and leg members comprising a rear plate and a front portion, wherein, the leg members are connected to a first plate, wherein, the angled adjustable seat further comprises at least one side plate connected by a hinge mechanism to permit said at least one side plate to be adjusted to a pocket position or a lower position; and
    a tool-free coupling for removably coupling the adjustable support bracket with the frame of the transport wagon without tools, such that the angled adjustable seat is secured onto the top surface to the frame of the transport wagon and the rear plate and the front portion of the angled adjustable seat are clamped to the side surfaces of the frame of the transport wagon,
    wherein the tool-free coupling includes a winch, a flexible member, and winch bar.

7. The adjustable support bracket of claim 6, wherein the flexible member is a strap, wire, or cable.

8. The adjustable support bracket of claim 7, wherein the rear plate and front portion are adapted to receive the flexible member.

9. The adjustable support bracket of claim 8, wherein the hinge mechanism further comprises a bar.

10. The adjustable support bracket of claim 9, wherein the flexible member is attached to a hook, wherein said hook is engaged with the bar of the hinge mechanism.

11. An adjustable support bracket for a transport wagon used to hold and transport a large object, said transport wagon having a frame with a top surface, opposed side surfaces and a bottom surface, said adjustable support bracket comprising:

an angled adjustable seat for supporting a portion of a large object, said angled adjustable seat having a top surface comprising a inclined plate and leg members comprising a rear plate and a front portion, wherein, the leg members are connected to a first plate, wherein, the angled adjustable seat further comprises at least one side plate connected by a hinge mechanism to permit said at least one side plate to be adjusted to a pocket position or a lower position;

a tool-free coupling for removably coupling the adjustable support bracket with the frame of the transport wagon without tools, such that the angled adjustable seat is secured onto the top surface to the frame of the transport wagon and the rear plate and the front portion of the angled adjustable seat are clamped to the side surfaces of the frame of the transport wagon; and height-adjust pins.

12. The adjustable support bracket of claim 11, further comprising a rear plate and front panel adapted to receive the height-adjust pins.

13. The adjustable support bracket of claim 12, wherein the side plate or side plates are secured to a bar of the hinge mechanism by a fastener.

14. The adjustable support bracket of claim 13, wherein the fastener is a lock nut.

\* \* \* \* \*